(12) United States Patent
Mazurek

(10) Patent No.: US 10,402,140 B2
(45) Date of Patent: Sep. 3, 2019

(54) MEMORY DEVICE WITH DISPLAY

(71) Applicant: Steven Mazurek, Boca Raton, FL (US)

(72) Inventor: Steven Mazurek, Boca Raton, FL (US)

( * ) Notice: Subject to any disclaimer, the term of this patent is extended or adjusted under 35 U.S.C. 154(b) by 82 days.

(21) Appl. No.: 15/674,181

(22) Filed: Aug. 10, 2017

(65) Prior Publication Data

US 2018/0046421 A1  Feb. 15, 2018

Related U.S. Application Data

(60) Provisional application No. 62/373,175, filed on Aug. 10, 2016.

(51) Int. Cl.

| *G06F 11/00* | (2006.01) |
| --- | --- |
| *G06F 3/14* | (2006.01) |
| *G06F 13/42* | (2006.01) |
| *G06F 12/02* | (2006.01) |
| *G06F 13/38* | (2006.01) |
| *G06F 11/07* | (2006.01) |
| *G06F 3/041* | (2006.01) |
| *G06F 3/0354* | (2013.01) |

(52) U.S. Cl.
CPC .............. *G06F 3/14* (2013.01); *G06F 11/073* (2013.01); *G06F 11/079* (2013.01); *G06F 11/0751* (2013.01); *G06F 11/0769* (2013.01); *G06F 12/0246* (2013.01); *G06F 13/385* (2013.01); *G06F 13/4282* (2013.01); *G06F 3/03547* (2013.01); *G06F 3/041* (2013.01); *G06F 2212/7201* (2013.01); *G06F 2213/0042* (2013.01)

(58) Field of Classification Search
USPC ............................................ 714/46
See application file for complete search history.

(56) References Cited

U.S. PATENT DOCUMENTS

| 2008/0059702 | A1* | 3/2008 | Lu | G11B 31/00 711/115 |
| --- | --- | --- | --- | --- |
| 2009/0128090 | A1* | 5/2009 | Bi | H02J 7/0054 320/103 |
| 2010/0017649 | A1* | 1/2010 | Wu | G06F 11/108 714/6.11 |
| 2010/0281209 | A1* | 11/2010 | Ni | G06K 19/07732 711/103 |
| 2014/0325266 | A1* | 10/2014 | Hoffman | G06F 11/2094 714/6.32 |
| 2014/0365708 | A1* | 12/2014 | Iwata | G06F 15/7867 711/102 |
| 2015/0163881 | A1* | 6/2015 | Pederson | H05B 33/0863 315/154 |

\* cited by examiner

*Primary Examiner* — Sarai E Butler
(74) *Attorney, Agent, or Firm* — Arent Fox LLP

(57) ABSTRACT

A portable memory device, for example a universal serial bus ("USB") flash drive that can inform the user, via a display, device information, for example, its capacity may be full or nearly full without the need to connect to a computer or separate processing device. The portable memory device supports various interconnectors for connecting to USB interfaces of different specifications, including any and all revised USB specifications as determined by the industry standard.

7 Claims, 9 Drawing Sheets

MEMORY DEVICE WITH DISPLAY

CROSS REFERENCE TO RELATED APPLICATION

This application claims the benefit of U.S. Provisional Application No. 62/373,175, filed Aug. 10, 2016, which is incorporated herein by reference in its entirety.

FIELD OF THE INVENTION

The embodiments discussed herein are related to a portable memory device comprising a display and the method of displaying information on a display of a portable memory device.

BACKGROUND

Today, portable memory devices have come a long way, from an expensive novelty item to an essential part of a technology user's arsenal, particularly in terms of safely and securely transporting data files from one device to another. Although cloud based services have skyrocketed in popularity because of their convenience, there are limitations to their use. For example, a connection to the Internet is required and the security of the user's files stored in the cloud are at risk. Attacks from hackers, which can lead to theft of private information or theft of data, or, in the case of businesses, theft of financial data or trade secrets, are just some of the examples of the aforementioned risk.

Conventional portable memory devices are unable to display to a user valuable parameter information unless they are connected to a computer or separate processing device. The computer or separate processing device accesses the portable memory device and processes data stored on the portable memory device to obtain different information parameters. Only at that point may the user visually obtain the valuable parameter information via a monitor or other display apparatus.

SUMMARY

According to an aspect of the invention, a portable memory device, for example a universal serial bus ("USB") flash drive, which is a multifunctional device, is provided to enlarge the application scope of the traditional mobile storage device. For example, a USB flash drive which utilizes a sliding mechanism to allow the USB interface to either protrude or retract; a small, full color capacitive touchscreen, whose purpose is to inform the user when the drive is either at filled capacity or nearing such a state, as well as a software based self-diagnostic program contained within the USB flash drive to inform the user if one or more components of the unit's flash memory is failing; and a security PIN feature which the user can setup on the USB flash drive itself to keep would-be hackers from accessing the device should it be lost or stolen.

The portable memory device would be able to interface with present and future USB specifications as they are developed and released and agreed upon as an industry standard. The interconnector, regardless of the USB specification being utilized, would provide a stable and quick data transfer both to and from the portable memory device.

DESCRIPTION OF THE EMBODIMENTS

Figure 1:
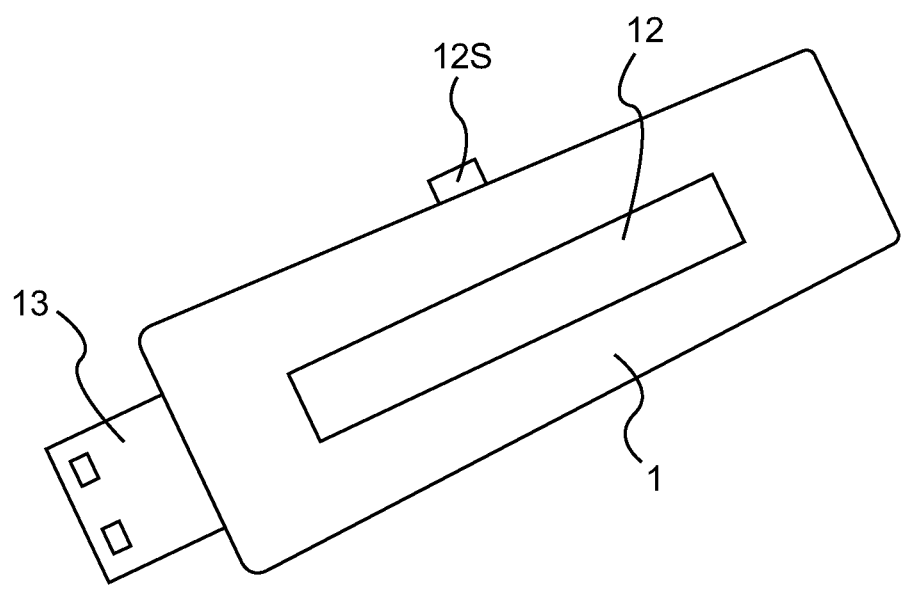
FIG. 1 is a perspective view illustrating an example of a USB flash drive, with a USB connector extended, comprising a display.

FIG. 1 is a perspective view illustrating an example of a USB flash drive, with a USB connector extended, comprising a display. In FIG. 1, the portable memory device is illustrated as a USB flash drive 1, with a small display screen 12 visible as well as the USB connector 13 protruding. The display screen 12 may be a color capacitive touchscreen incorporating a liquid-crystal display ("LCD"), an electronic ink ("E Ink") display, a light-emitting diode ("LED") display, or an organic light-emitting diode ("OLED") display.

Figure 2:
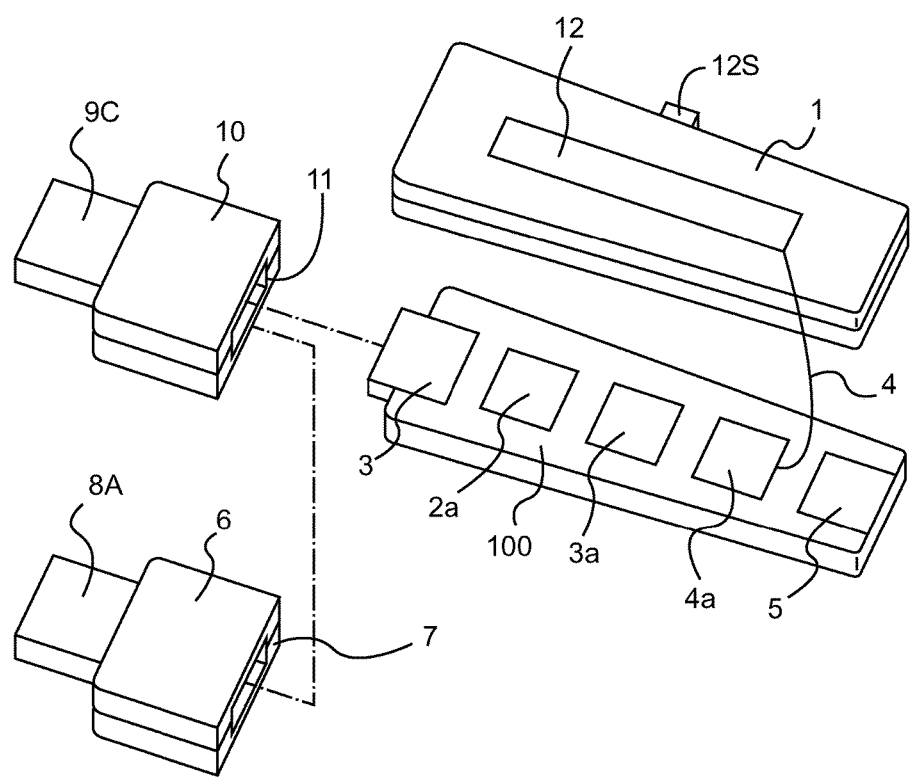
FIG. 2 is a perspective exploded view illustrating an aspect of the present invention.

FIG. 2 is a perspective exploded view of FIG. 1. FIG. 2 illustrates the USB flash drive disassembled, exposing its internal components as well as a detailed view of what each component is and what purpose it serves. More specifically, the unit itself has a printed circuit board 100 which may contain a series of chips, for example, a controller 2a, a memory chip 3a, and a chip 4a, which is dedicated to the built-in software program that allows the flash drive to determine parameters of the memory chip 3a. For example, how much the flash drive can store on the memory chip (total capacity), how much space has been used on the memory chip 3a, and how much memory space still remains for the user on the USB flash drive. Additionally, the chip 4a, may contain the video display circuitry necessary to output information to the display screen 12. Further, the controller 2a may be a central processing unit ("CPU") or a processor. In addition, there is a small connector 4 which attaches to the display screen 12, thereby creating the necessary electrical connection in order for the USB flash drive to display the information on the display screen 12 as retrieved by the user.

The sliding mechanism control 12S is pictured on the upper portion of the USB flash drive, with the spring and locking mechanism hidden within it. The sliding mechanism control 12S, will be described in detail later. The power source 5, shown located near the end of the USB flash drive, may be for example, a non-removable battery.

The number of memory chips may be adjusted based upon a predetermined storage capacity of the USB flash drive. The memory chip 3a, may be for example a flash memory chip, solid state memory, or the like. In addition, the chip 4a which contains the self-diagnostic program, that may also help the user determine if at any time one or more components of the USB flash drive is failing. For example, visual indicators on the display 12 can be configured to guide the user in regards of the state of the USB flash drive.

The USB connector 5 of the USB flash drive may support at least two industry USB standards, including USB standard Type-A via connector 8A and USB standard Type-C via 9C, with the necessary housing for the two standard connectors, Type-A connector, via 6 and 7, and Type-C connector via 10 and 11.

Figure 3:
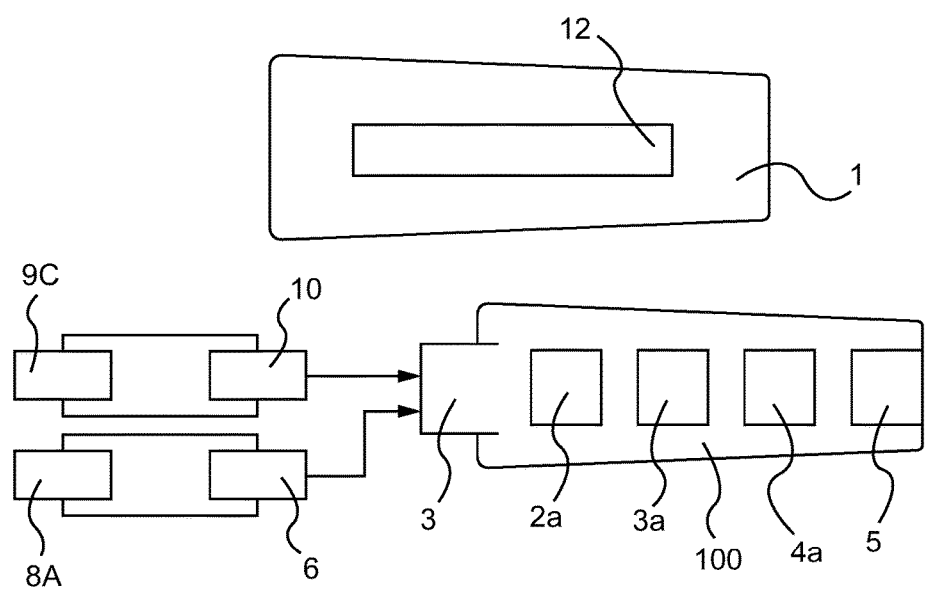
FIG. 3 is a block diagram of an aspect of the present invention.

Referring to FIG. 3, the USB flash drive in accordance with the present invention includes a USB flash drive 1 and at least one interconnector, as explained above, either 8A and 9C. The built-in printed circuit board 100 of the USB flash drive has a USB interconnector 3 at one end thereof which is in connection with a controller 2a, and a memory chip 3a to create a connection. In addition to the memory chip 3a, the printed circuit board 100 features a chip 4a which may contain the self-diagnostic program as well as a video display circuitry which outputs the image to the display 12 featured on the side of the USB flash drive.

The USB flash drive 1 does not need to be connected to an external power source to power the display. Rather, the USB flash drive comprises an embedded power source 5, which may be a non-removable rechargeable lithium polymer battery. The printed circuit board 100 may also work in conjunction with the power source 5 to prevent the overcharging of the power source, thereby preventing any potential damage to the power source or the USB flash drive itself.

Additionally, FIG. 3 also shows one USB interconnector 3, controller 2a, the memory chip 3a, and the chip 4a which contains the program which sends the appropriate instructions, whether it be for capacity or self-diagnostic to the display. This function is supplied by the power source 5 contained within the USB flash drive's housing. The power source may be located at the rear of the housing of the USB flash drive and behind the dedicated memory chip 3a. Alternatively, when the power source is low, the power may be supplied by an external source (i.e., when the USB flash drive is connected to a notebook, desktop, or even a tablet with the appropriate USB port).

In addition, FIG. 3 shows the different possible USB connectors which can be attached to the drive, including USB Type-A connector 8A, as well as USB Type-C 9C connector.

Figure 4:
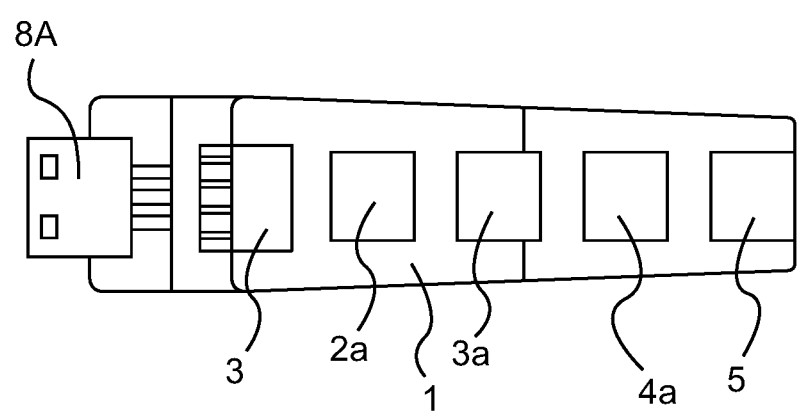
FIG. 4 is a sectional view illustrating an aspect of the present invention.

FIG. 4 illustrates a sectional view of the internal portion of the USB flash drive. For purposes of simplicity, only the USB Type-A connector 8A is shown, but any connection may be used. The USB Type-A connector 8A is located on the far left of the figure, creating a connection to the rest of the components of the USB flash drive 1. The internal components are as follows: a USB interconnector 3, a controller 2a, a memory chip 3a, and a chip 4a for storing for the information of the display and self-diagnostic program, and a power source 5. Note that the order and layout of the internal components may be arranged in any order for design purposes.

Figure 5:
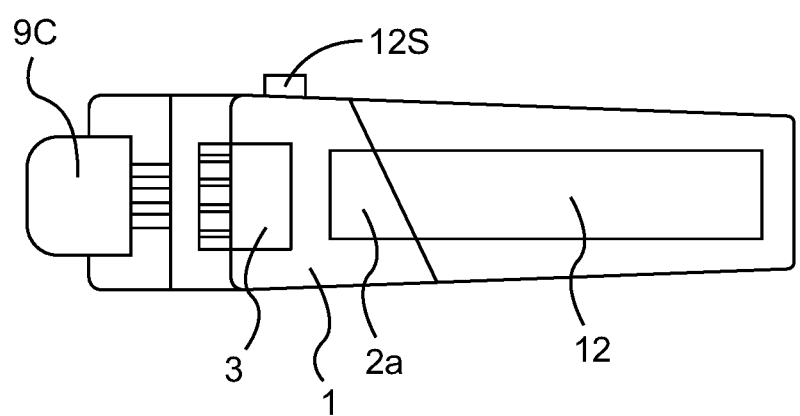
FIG. 5 illustrates a sectional view of the internal portion of an aspect of the present invention with the sliding mechanism.

FIG. 5 illustrates a sectional view of the internal portion of the USB flash drive 1. Additionally, FIG. 5 illustrates a top portion of the housing and the screen partially covering some of the internal components, as described above, of the USB flash drive.

Figure 6:
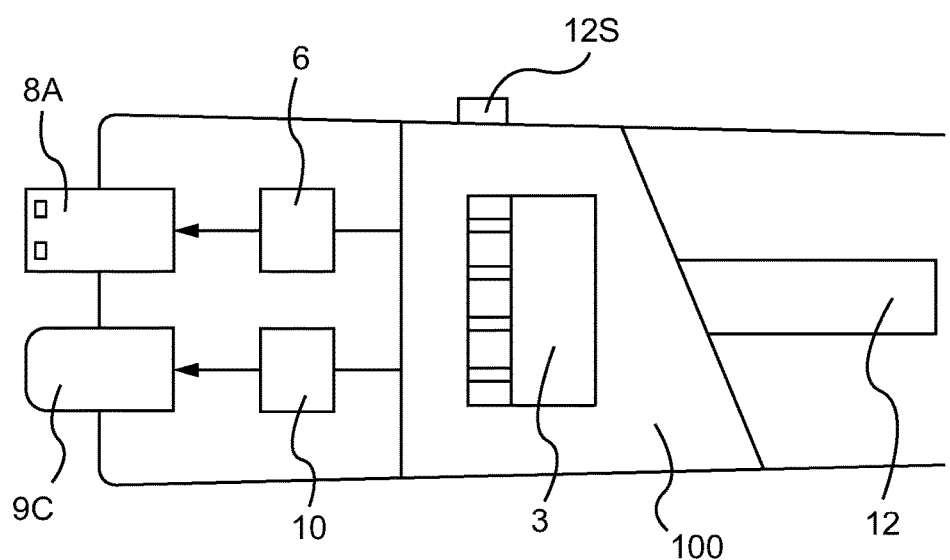
FIG. 6 illustrates a sectional view of the internal portion of an aspect of the present invention with the sliding mechanism.

FIG. 6 shows a similar side view display, but includes the implementation of the USB Type-C connector 9C as well as the USB Standard-A connector 8A. Furthermore, the display 12 may be connected to the printed circuit board 100 via a small connector, as shown in FIG. 2 4, of the USB flash drive providing power as well as the appropriate information to the display 12.

The USB flash drive's display screen 12 may operate as a small capacitive touch screen by allowing the user to swipe to either the left or right using one's finger or thumb to get to the information as sought by the user. When the USB flash drive is initially powered on either by touching the display 12 or connecting to a computer or separate processing device, the display will display, through a series of colored bars, the amount of space free on the USB flash drive versus the amount of space used. The colored bars may also serve as a progress bar to indicate when the operation of transferring the file or files from or to the USB flash drive has been completed. This feature would be in lieu of a flashing activity light to show that the USB flash drive is, in fact, active.

A swipe to the left or right may show the total capacity of the USB flash drive as well as a 'Settings' icon in which the user can customize several features, as well as an icon to run the self-diagnostic program. Also contained within the 'Settings' menu is the ability for the user to set the display to turn off, thereby saving the power source stored power. The user may also set a predetermined amount of time before the display automatically turns off. Pressing and holding down on the screen may allow the screen to power back on.

Another aspect of the invention would be for a user to plug the USB flash drive into a powered USB port on another device, such as a computer or separate processing device, and automatically power on the display as well as make the USB flash drive device usable for data transfers. Swiping to the right or left may allow the user to have the USB flash drive display, in text form, the amount of space on the USB flash drive being used, as well as the amount of memory space remaining on the flash drive in both numeric form (i.e., 32 GB total memory capacity; 16 GB of memory space available) as well as percentage of space used and still available (e.g., 80% of memory space used and 20% of space available to the user).

The USB flash drive 1 with the described aforementioned and following features could therefore allow a user to determine if the USB flash drive has enough capacity to hold an additional file (or folder containing several files) without having to plug the USB flash drive into another device, such as a computer, separate processing device or other traditional method, and determine the memory space used versus memory space remaining. In addition, the ability to determine the functional state of the USB flash drive is a feature which can help the user determine whether or not it is safe to continue using the current USB flash drive or if the data being stored on the memory chip is in danger of being lost or corrupted. Thus, it is necessary at that time to transfer their information to a different storage device.

The software based self-diagnostic program could determine the USB flash drive's state by having programmed the state of how the chips, for example the controller 2a, the memory chip 3a, and the chip 4a, contained within the housing should function, including all of the normal operations associated with each component. If one or more components within the USB flash drive deviates from a set standard, the USB flash drive can alert the user via a notification on the display screen 12. Thus, these types of alerts would allow the user to take the appropriate action, such as moving data to another mobile storage device.

Securing data files is a relevant concern to a technological user in the world today. Therefore, in order to help secure the USB flash drive in the case of loss or theft, the user could have the ability to setup a four digit personal identification number ("PIN") from the settings feature, as described above. Further, the four digit PIN can be chosen by a user out of the more than 10,000 possible combinations of which there can be with the choices of zero through nine.

The USB flash drive 1 comprises an outer USB connector 13 that can be constructed as a USB interface. The USB connector can be fastened into the inside of the housing, which can either extend or retract via the sliding mechanism control 12S. When the USB connector 13 is extended, the outer end of the USB connector extends outside the housing. Further, when the USB connector 13 is retracted, via the sliding mechanism control 12S, the USB connector is stowed in the housing of the USB flash drive 1. The USB connector 13 and the socket correspond to each other for a stable interconnection. The arrangement positions of the USB connector 13 and the socket can be exchanged to reach the same stable interconnection.

The aforementioned USB connector 13 can conform to the USB 3.1 standard, which corresponds to the USB standard Type-A connector 8A, known for the flat wide shape design, among other standards. This standard is provided as an example to ensure widespread compatibility (as well as backwards compatibility with the USB 2.0, 1.1 and 1.0 standards) with existing devices while offering the speed and performance of the USB 3.1 standard. Future versions of the USB flash drive may include USB standard Type-C connector 9C, and any future standard variations thereof, among other standards. For purposes of simplicity, both connectors 9C and 8A correspond to USB connector 13. Based on the aforementioned information, the USB connector 13 can only be connected to one device at a time, for example, a tablet computer with a full USB port, a desktop or a notebook computer. The USB flash drive 1 illustrated in FIGS. 4 through 6 are shown as examples that may work with the aforementioned commercially available products.

Figure 7:
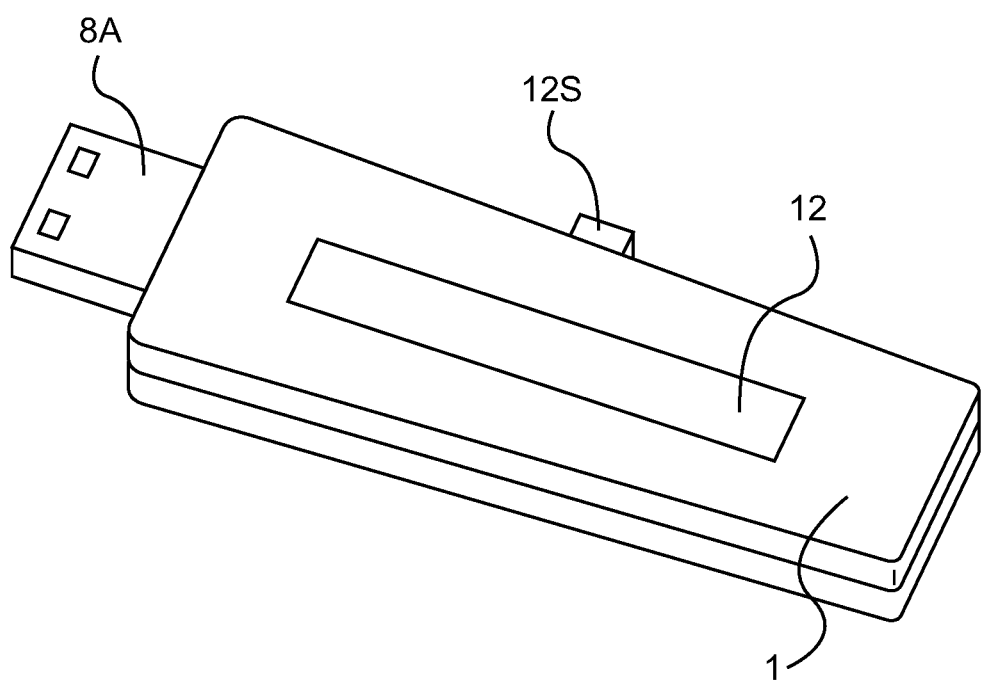
FIG. 7 is a perspective view incorporating the sliding mechanism illustrating an aspect of the present invention.
Figure 8:
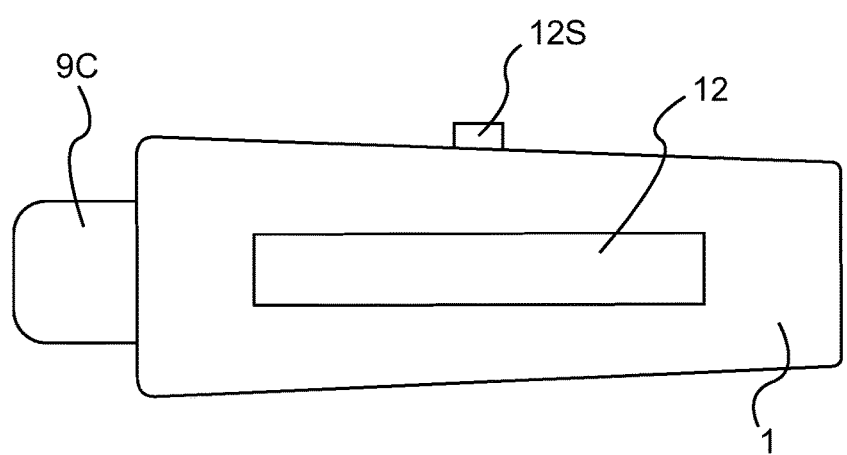
FIG. 8 is a perspective view incorporating the sliding mechanism illustrating an aspect of the present invention.
Figure 9:
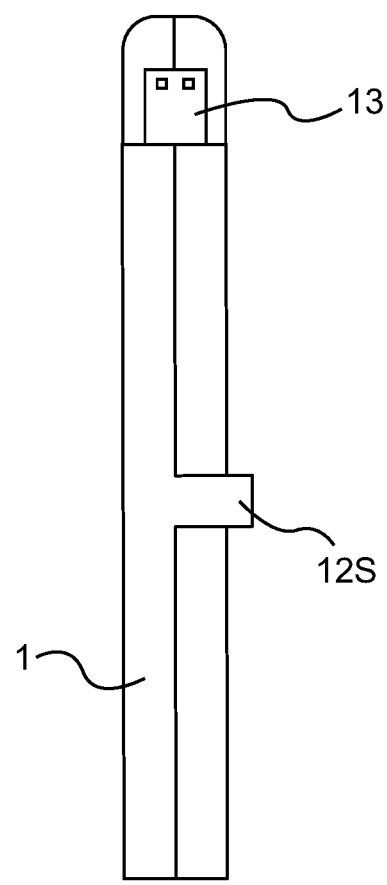
FIG. 9 is a side view incorporating the sliding mechanism illustrating an aspect of the present invention.

FIGS. 7 through 9 illustrate assembly views of the USB flash drive 1 in accordance with the various aspects. The mobile storage device and the interconnectors 8A, 9C and 13, respectively, are put together, thereby forming the USB flash drive 1 of the present application. In place of a cap or clip mechanism, the USB flash drive 1 may feature a sliding mechanism control 12S. The sliding mechanism control 12S, as explained below, may be located above the display screen 12. The user may activate the sliding mechanism control 12S, thus allowing the USB connector 13 to either extend or retract, depending on the desired function. This sliding mechanism control 12S may contain a tiny spring embedded within, requiring the user to push it down, thereby effectively stopping the USB connector 13 from sliding out involuntarily and causing the interconnector to be exposed without the intent of the user. Additionally, an exposed USB connector 13 may allow for damage to occur, such as breaking off or becoming mutilated.

FIG. 8 illustrates an example USB flash drive 1 with the USB standard Type-C connector 9 in the extended state, as well as the housing, the display screen 12 and the sliding mechanism control 12S.

FIG. 9 illustrates a side view of USB flash drive 1, with the USB connector 13 in the retracted 12, along with the sliding mechanism control 12S.

The features of the memory device described above, may be based on a non-transitory computer-readable storage medium storing a program that causes a processor to execute a process. The storage medium may be on one or more integrated circuits or chips contained within the USB flash drive 1. The integrated circuits or chips may be additional and separate from the storage capacity, such as memory 3a, also contained within the USB flash drive 1.

The capacity of the USB flash drive 1 may be determined by a program stored on one of the integrated circuits, interchangeably referred to herein as chips. The integrated circuits store the initial capacity of the USB flash drive 1 as a constant value. For example, the total capacity of the USB flash drive 1 may be 1 GB. The initial capacity of the USB flash drive may be a constant value of 0.99 GB, which takes into account the amount of space used for formatting, for example 0.01 GB. The USB flash drive may be based upon, and formatted under, a FAT32 file system. Other formatting schemes may be used.

The remaining capacity that may be displayed on the display screen 12 of the flash drive 1 may be determined based on the initial capacity minus the amount of data already stored on the flash drive. For example, the initial capacity of the USB flash drive 1 may be 0.99 GB. The USB flash drive may already have stored 0.19 GB of data, files, and folders, among other information. Therefore, the remaining capacity of the flash drive to be displayed on the display screen is 0.80 GB, i.e, 0.99 GB minus 0.19 GB.

Additionally, for example, the remaining capacity, described above as 0.80 GB, may be displayed on the display screen 12, along with the file system that the USB flash drive was formatted under, FAT32, by swiping across the display. The information may be displayed as text, a graph, a chart, or a combination thereof. For example, if the user adds 0.2 GB of files to the USB flash drive, an appropriate number of bars would appear on the display in either real-time (or as close to real time as possible) or when the flash drive is updated via a swipe of the display.

Additionally, a separate program may also reside on one of the integrated circuits contained within the USB flash drive, which may cause a processor to execute a process regarding the functionality of the storage capacity, such as memory 3a. For example, the program would determine the state that the storage capacity/memory 3a, or any additional integrated circuits, are operating and/or functioning properly. The operation/functionality of the capacity, such as memory 3a, or any additional integrated circuits, may be based on temperature, the time to retrieve or store data, or a standard in the art.

If any one of the capacity, e.g., memory 3a, or any additional integrated circuits deviate from a standard, as determined above, the USB flash drive may determine that a fault has occurred. This fault may also be displayed on the display screen 12. The display screen may warn the user that the data stored on the USB flash drive may be at risk of corruption. Additionally, the USB flash drive may also display on the display screen 12 that the device is in good working condition if a fault is not determined.

Additionally, a separate program may also reside on one of the integrated circuits contained within the USB flash drive, which would cause a processor to execute a process regarding the PIN feature, as described above. The PIN feature may allow the user to input a four digit (or other number of digits) personal identification number to secure the contents of the flash drive.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

I claim:

1. A universal serial bus ("USB") flash drive comprising:
    a retractable USB connector configured to operate according to at least a USB Type standard;
    a controller comprising a processor;
    a first memory coupled to the controller;
    a power source;
    a second memory; and
    a display screen configured to display status information regarding the USB flash drive;
    wherein
        the display screen is a touch screen display;
        the first memory is a flash memory configured to store user data;
        the second memory is configured to store a self-diagnostic program; and
        the controller is configured run the self-diagnostic program and to display the status information on the display screen as a numerical value.

2. The USB flash drive according, to claim 1, wherein the power source is embedded, rechargeable, and non-removable.

3. The USB flash drive according to claim 2, wherein the power source is a lithium polymer battery.

4. The USB flash drive according to claim 3, wherein the touchscreen display is at least one of a liquid-crystal display ("LCD"), an electronic ink ("E Ink") display, a light-emitting diode ("LED") display, or an organic light-emitting diode ("OLED") display screen.

5. The USB flash drive according to claim 1, wherein the status information comprises at least one of available memory space of the USB flash drive, used memory space of the USB flash drive, remaining power storage, usage of time indicator, or user identification information.

6. The USB flash drive according to claim 1, wherein the self-diagnostic program is adapted to inform the user of a usage state of the USB flash drive via a color touchscreen display.

7. The USB flash drive according to claim 1, wherein the retractable connector is configured to extend and retract via a sliding mechanism.

* * * * *